United States Patent [19]

Ernst et al.

[11] 4,267,913

[45] May 19, 1981

[54] CLUTCH RELEASE DEVICE

[75] Inventors: Horst M. Ernst, Eltingshausen; Armin Olschewski, Schweinfurt; Rainer Schürger, Schwanfeld; Lothar Walter, Schweinfurt; Manfred Brandenstein, Aschfeld; Erich Burkl, Stammheim, all of Fed. Rep. of Germany

[73] Assignee: SKF Kugellagerfabriken GmbH, Schweinfurt, Fed. Rep. of Germany

[21] Appl. No.: 879,745

[22] Filed: Feb. 21, 1978

[51] Int. Cl.³ .............................................. F16D 23/14
[52] U.S. Cl. ................................. 192/98; 192/995; 192/110 B; 308/233
[58] Field of Search ............... 192/98, 99 R, 99 S, 192/110 B, 70.27, 89 B; 308/233

[56] References Cited

U.S. PATENT DOCUMENTS

| | | | |
|---|---|---|---|
| 556,257 | 3/1896 | Dismukes | 308/233 |
| 2,093,799 | 9/1937 | Bemis | 192/98 |
| 2,228,016 | 1/1941 | Pearson | 192/110 B |
| 2,725,965 | 12/1955 | Binder | 192/98 |
| 3,317,014 | 5/1967 | Pitner | 192/98 |
| 3,357,529 | 12/1967 | Binder et al. | 192/98 |
| 3,744,607 | 7/1973 | Hausinger | 192/98 |
| 3,815,715 | 6/1974 | Maucher | 192/98 |
| 3,885,658 | 5/1975 | Ernst et al. | 192/98 |
| 3,913,714 | 10/1975 | Camp | 192/99 S |

FOREIGN PATENT DOCUMENTS

| | | | |
|---|---|---|---|
| 1189810 | 3/1965 | Fed. Rep. of Germany | 192/98 |
| 2327022 | 5/1973 | Fed. Rep. of Germany | 192/89 B |
| 539689 | 9/1941 | United Kingdom | 192/99 S |

*Primary Examiner*—Allan D. Herrmann
*Attorney, Agent, or Firm*—Daniel M. Rosen

[57] ABSTRACT

In a clutch release device, a clutch release lever engages one ring of a clutch release bearing, and the bearing ring and release lever are formed to inhibit relative rotation therebetween. For this purpose, the bearing ring may have a polygonal outer surface, in which case the release lever may have parallel flanges between which opposite parallel surfaces of the polygonal section of the bearing ring may be inserted. Alternatively, the release lever may have a wedge shaped portion adapted to engage a braking surface of the bearing ring, formed of a plastic material. In a further modification, the bearing rings have grooves or corrugations in a radially extending surface and adapted to be engaged by one or more projections on the clutch release lever.

15 Claims, 9 Drawing Figures

CLUTCH RELEASE DEVICE

BACKGROUND OF THE INVENTION

This invention relates to a clutch release device, especially for vehicles, including a clutch thrust bearing with rolling bearings. The bearing is arranged so that one of its rings engages a diaphram or Belleville spring of the clutch, the stationary bearing ring or the bearing engaging a clutch release lever.

Clutch release bearings for this type of clutch device are already known. In known constructions of such bearings, the bearing rings only have rubbing contact with the release lever. Adequate centering of the bearings with respect to the diaphram or Belleville spring is only possible with difficulties in such arrangements, so that the parts of the clutch release devices which lay against one another are relatively rapidly worn and destroyed.

It is therefore an object of the present invention to provide a clutch release device and clutch release bearing of the above type, which overcomes the above described disadvantages, is comprised of only a few inexpensively produced parts, and which can be assembled without difficulty and without the possibility of erroneous location of the components.

SUMMARY OF THE INVENTION

In accordance with the invention, the above object is achieved by providing a clutch release device wherein the fixed bearing ring of the bearing is connected or coupled to the clutch release lever in a manner to inhibit relative rotation therebetween. In other words, the interconnection is a close-fitting interconnection with respect to circumferentially directed forces.

In one embodiment of the invention, the stationary bearing ring can have a surface that has a polygonal cross section with parallel opposite sides. In this case, the release lever may have a pair of parallel flanges spaced apart a sufficient distance that the polygonal surface of the bearing ring can be fit between these flanges with a certain degree of play, while inhibiting rotational movement therebetween. In order to permit rapid assembly of this structure, without danger of misalignment, the flanges may be provided with a pair of angled sections having tapers positioned to permit blind assembly of the components.

According to a further embodiment of the invention, the side of the bearing ring facing the release lever is provided with a brake layer, for example, of incompletely cured plastic material that can be subsequently set.

In still a further embodiment of the invention, in order to further ensure that the stationary bearing ring does not rotate with respect to the release lever, several grooves or corrugations can be distributed about the circumference of the bearing ring, the release lever being provided with one or more projections positioned to axially engage one or more of these grooves or corrugations.

BRIEF DESCRIPTION OF THE DRAWINGS

In order that the invention will be more clearly understood, it will now be disclosed in greater detail with reference to the accompanying drawings, wherein.

Similar parts in the different embodiments of the invention are provided with the same reference numerals, in order to avoid confusion.

DETAILED DESCRIPTION OF THE PREFERRED EMBODIMENTS

Figure 1:
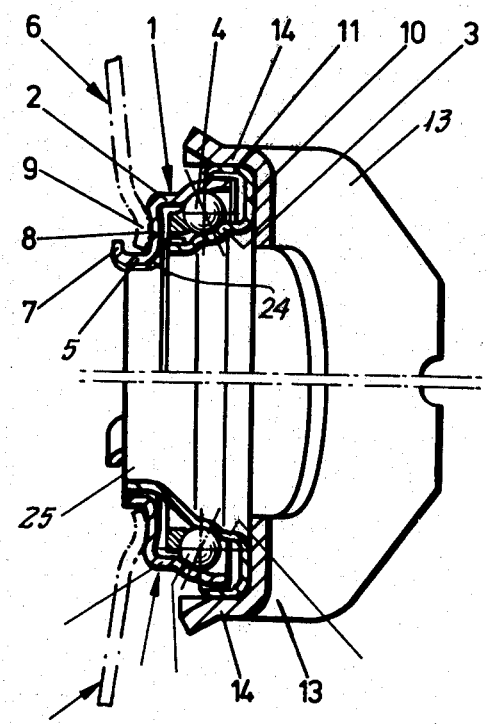
FIG. 1A is a cross-sectional view of a clutch release device according to one embodiment of the invention, wherein the stationary bearing ring has a polygonal cross section in order to inhibit the rotation thereof with respect to the clutch release lever.
FIG. 1B is a cross-sectional view of a modification of the clutch release of FIG. 1A.
Figure 2:
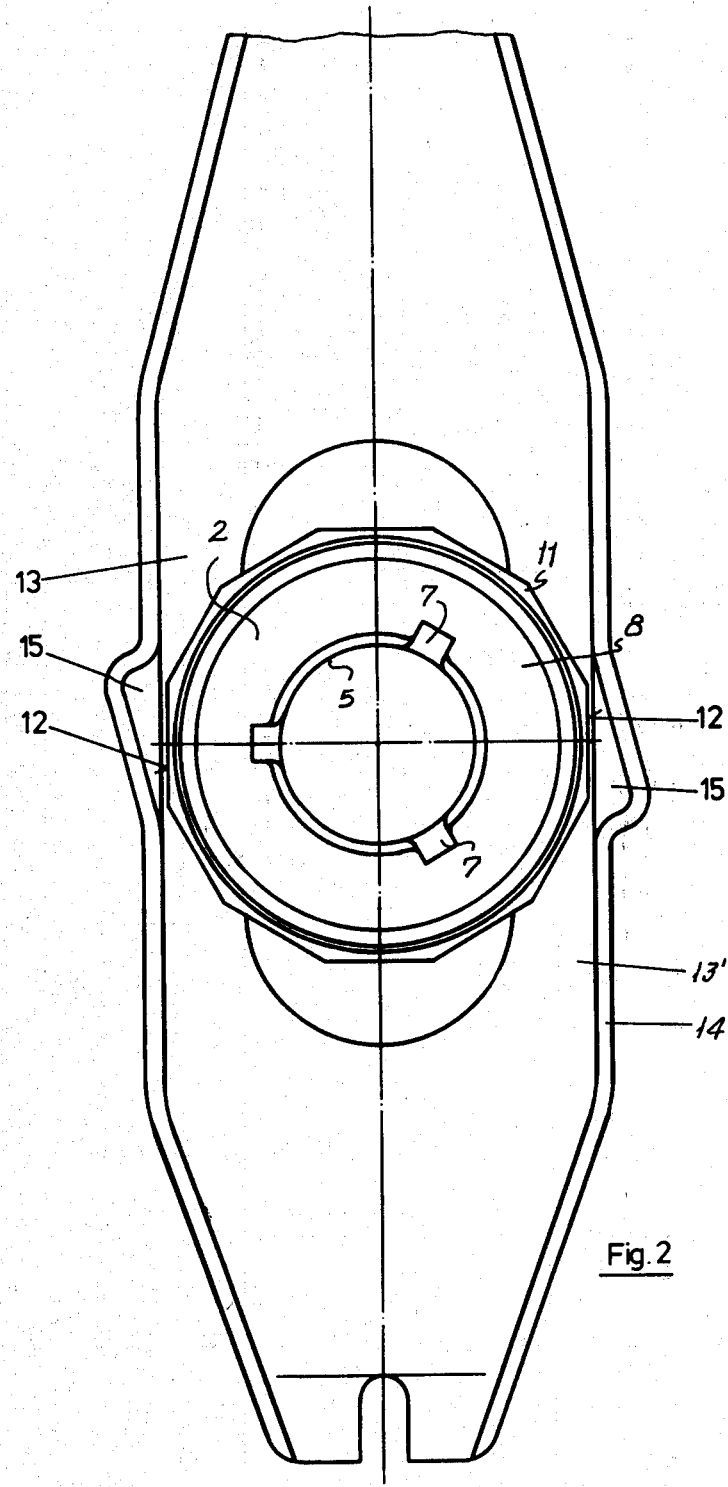
FIG. 2 is a side view of the clutch release according to FIG. 1A, showing the clutch release on both sides of the axis thereof.

Referring now to the drawings, FIGS. 1A and 2A show a clutch thrust bearing 1 having sheet metal bearing rings 2 and 3. The rotatable outer ring 2 has a substantially Z-shaped cross section. A plurality of rolling elements, such as balls 4, are provided between the inner and outer rings, and a cage of conventional nature may be provided to hold the rolling bodies. An axially extending portion 5 of the outer ring 2 away from the rolling bodies extends through the hole of the diaphragm spring or Belleville spring 6 of the clutch, and several projections 7, distributed about the circumference of the section 5, may be radially outwardly directed in order to ensure that the bearing ring is held in the axial direction with respect to the spring 6. As illustrated, the projections 7 may not engage the springs 6.

The outer ring 2 has a radially outwardly directed annular portion 8 extending from the portion 5, the annular portion 8 being adapted to engage the radially inward end of the spring 6. The section 8 of the outer ring 2 is concave toward the spring 6, i.e., in cross-section so that the centers of curvature of the different cross-sections of this portion of the bearing ring define a circular locus, and the radial inner end of the spring 6, or of spring fingers 9 forming spring 6, are bulged toward the section 8, in order to enable selfcentering of the bearing with respect to the spring 6. From the radially outer end of the portion 8, the rotatable bearing ring 2 may extend again generally axially to form a bearing race for the rolling elements 4.

The inner ring 3 has a radially outwardly directed side 10, and a flange 11 or the like extending from the radially outer extremities thereof toward the spring 6 radially outwardly of the outer ring 2. The end of the flange 11 may be radially inwardly directed to correspond to a similarly shaped portion of the outer ring 2, with play, to inhibit relative separation in the axial direction of the inner and outer rings. The axially directed portion 11 of the inner ring in the embodiment of the invention of FIG. 1A is polygonal, i.e., in the plane normal to the axis of the bearing, with an even number of sides 16, so that this bearing has a plurality of pairs of parallel opposite side surfaces 12 extending in planes parallel to the axis of the bearing. The sheet metal release lever 13 has a base 13', from which a pair of parallel flanges 14 extend in the same direction on opposite sides of the axis of the device. The sections 14 are spaced apart a distance slightly greater than the outer distance between the polygonal surfaces of the inner ring, so that the inner ring may be inserted between the parallel sections 14 of the release lever, with play. The portions 14 of the release lever are sufficiently close, however, that the inner ring cannot be rotated with respect to the release lever once it has been inserted between the axially extending portions 14. The outer portion of the rim of the sections 14 on each side of the release lever 13 is bent, as more clearly illustrated in FIG. 2, to form bevel edges 15 to simplify the slipping of the inner rings into position between the parallel sections 14. The bent sections 15 are bevelled inwardly, so that the inner ring is so turned in the circumferential direction during assembly, that it can be positioned in the space between the parallel sections 14 without difficulty. As a consequence, it is possible to readily assemble the release bearing to the clutch release without the necessity for the operator to visually align the elements. In addition, in this arrangement in accordance with the invention the assembly has a minimum building height, since the bearing 1 is positioned generally between the parallel flanges 14 of the release lever.

Figures 3A, 3B:
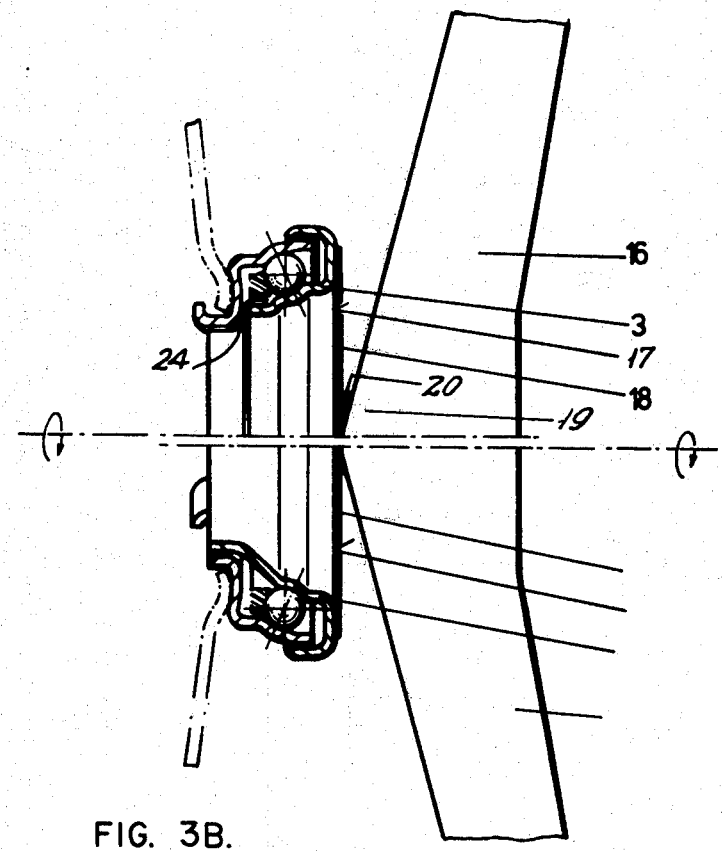
FIG. 3A is a clutch release in accordance with the invention wherein the turning of the stationary bearing ring is inhibited by means of a brake layer.
FIG. 3B is a cross-sectional view of a modification of the clutch release of FIG. 3A.

FIG. 3A discloses an embodiment in accordance with the invention which differs from the above disclosed embodiment, in that the facing surface 17 of the inner ring toward the release lever 16 is provided with a brake layer 18, for example, of a relatively soft plastic material, and the release lever 16 has a wedge shaped section 19 pressed against the brake layer 18. A mound or ridge 20 is formed in the brake layer 18 due to the pressing of the release lever at the contact position, and this ridge or mound further ensures that no relative turning of the inner ring and release lever occurs. This arrangement provides the advantage, if an incompletely cured relatively softer plastic material is employed for the brake layer 18, that a correspondingly larger mound or ridge 20 will be formed, the plastic material being hardened at a later determined time in order to ensure that no relative turning between the inner ring and the release lever occurs.

Figures 4A, 4B:
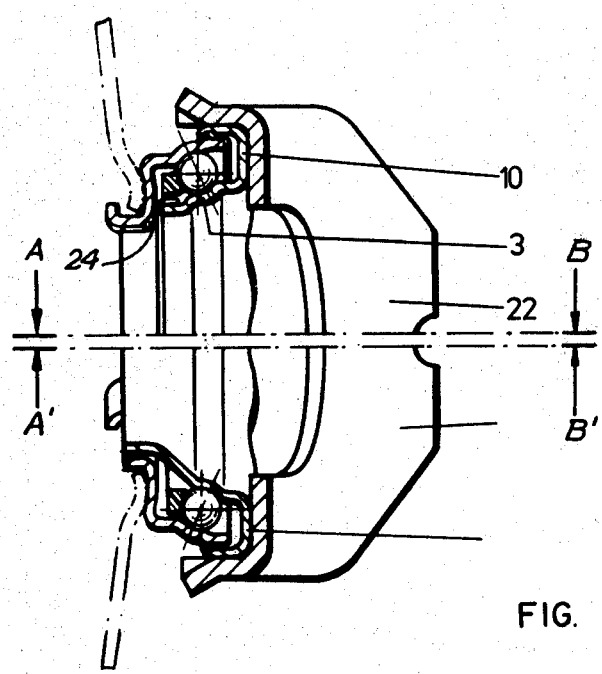
FIG. 4A is a cross-sectional view of a clutch release according to the invention in which turning of the outer bearing ring with respect to the clutch release lever is inhibited by the provision of grooves or corrugations on the bearing ring.
FIG. 4B is a cross-sectional view of a modification of the clutch release of FIG. 4A.
Figures 5A, 5B:
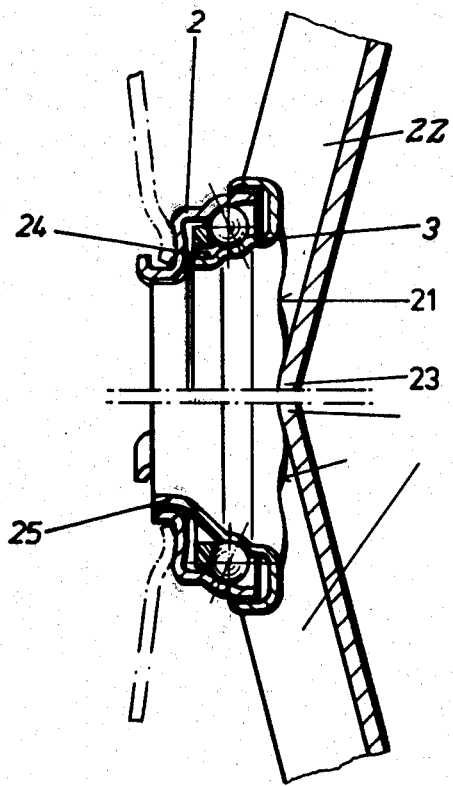
FIG. 5A is a section through the clutch release of FIG. 4A taken along the lines A-B of FIG. 4A.
FIG. 5B is a sectional view of the clutch release of FIG. 4B taken along the lines A'-B' of FIG. 4B.

In accordance with a further embodiment of the invention, as illustrated in FIGS. 4A and 5A, the radially directed portion 10 of the inner ring 3 is provided with one or more axially directed grooves or corrugations 21 distributed about its circumference. One or more projections 23 are provided on the release lever 22 in order to engage one or more of these corrugations 21, thereby to ensure that the inner ring does not turn with respect to the release lever.

FIGS. 1A, 3A, 4A and 5A disclose arrangements in accordance with the invention wherein the space between the inner ring and the outer ring is sealed by means of a Z-shaped sheet metal seal 24. This seal extends generally inwardly of the portion 5 of the outer ring, and thence radially outwardly through the gap between the inner ring and outer rings, as illustrated in the drawings. In the arrangements of FIGS. 1B, 3B, 4B and 5B, the sheet metal seal 24 is omitted, and in the corresponding embodiments of the invention the side of the inner ring 3 directed toward the spring 6 is axially lengthened, as illustrated at reference numeral 25, so that this extension projects in the hole of the outer ring and forms a sealing gap with the outer ring.

While the invention has been disclosed and described with reference to a limited number of embodiments, it will be apparent that variations and modifications may be made therein, for example, in the construction of the individual components. For example, in the embodiment of the invention illustrated in FIG. 1A, it is not necessary that the polygonal surface be on the bearing ring, nor that it form the radial outer most extremity of the bearing ring, it being only necessary that the arrangement in accordance with the invention inhibits relative rotation between the bearing ring and the clutch release lever with respect to the axis of the bearing. Further, while the specification has disclosed a specific configuration, i.e., the provision of a taper of specific form, for the running-in section enabling ready assembly of the bearing, it will be apparent that variations in the shape of this portion of the structure may be made, which also enable blind assembly of the components, i.e., assembly out of the vision of an assembler. Similarly, with respect to the embodiments of the invention illustrated in FIGS. 4A and 5A, it is apparent that the locations of the rotation inhibiting means may be relatively transposed between the bearing ring and the clutch release lever. It is therefore intended in the following claims to cover each such variation and modification as follows within the true spirit and scope of the invention.

What is claimed is:

1. In a clutch release system wherein a clutch release bearing has rolling elements arranged between first and second bearing rings, the second bearing ring is shaped to be axially held with respect to the diaphragm spring of the clutch, and a clutch release lever is mounted to directly engage said first bearing ring, the improvement wherein said first bearing ring and said clutch release lever have cooperating first and second holding means respectively positioned to directly engage one another for holding said first bearing ring at a fixed angular displacement with respect to said clutch release lever, with respect to the axis of said bearing.

2. The clutch release system of claim 1 wherein one of said first and second holding means comprises at least one groove on the respective member, and the other said holding means comprises at least one projection positioned to engage said groove.

3. The clutch release system of claim 1 wherein said first holding means comprises radially extending corrugations on a surface of said first ring toward said clutch release lever, and said second holding means comprises at least one projection positioned to engage said corrugations.

4. The clutch release system of claim 1 wherein said second bearing ring has a radially outwardly extending portion at one end thereof for inhibiting axially release of said bearing from the diaphragm spring of the clutch.

5. The clutch release system of claim 1 wherein one of said first and second holding means comprises a radially extending brake layer on the respective number, and the other of said holding means comprises a wedge shaped surface on the respective member and positioned to engage said layer.

6. The clutch release system of claim 5 wherein said radially extending brake layer comprises a layer of plastic material on a surface of said first ring facing said clutch release lever and said other of said holding means comprises a wedge shaped section on said clutch release lever and engaging in said plastic layer.

7. The clutch release system of claim 6 wherein said plastic layer is incompletely hardened.

8. In a clutch release system wherein a clutch release bearing has rolling elements arranged between first and second bearing rings, the second bearing ring is shaped to be axially held with respect to the diaphragm spring of the clutch, and a clutch release lever is mounted to directly engage said first bearing ring; improvement wherein said first bearing ring and said clutch release lever have cooperating first and second holding means respectively positioned to directly engage one another for holding said first bearing ring at a fixed angular displacement with respect to said clutch release lever, with respect to the axis of said bearing, one of said first and second holding means comprising a portion on the respective member with a cross-section defining a polygon having parallel opposed sides, said sides extending in planes parallel to the axis of said bearing, and the other holding means comprising a pair of axially directed flanges on the respective member.

9. The clutch release system of claim 8 wherein said one holding means comprises an outer periphery of said first ring, and said flanges comprise flanges on said clutch release lever that are spaced apart a difference slightly greater than the sides of said polygon.

10. In a clutch release system wherein a clutch release bearing has rolling elements arranged between first and second bearing rings, and a clutch release lever is mounted to engage said first bearing ring, the improvement wherein said first bearing ring and said clutch release lever have cooperating first and second holding means respectively for inhibiting relative rotation between said first bearing ring and said clutch release lever, with respect to the axis of said bearing, said first and second holding means comprising a portion on the respective member with a cross-section defining a polygon having parallel opposed sides, said sides extending in planes parallel to the axis of said bearing, and the other holding means comprising a pair of axially directed flanges on the respective member, said one holding means comprising an outer periphery of said first ring, said flanges comprising flanges on said clutch release lever that are spaced apart a difference slightly greater than the sides of said polygon, the edges of said parallel flanges having angled sections to enable rapid assembly of said release bearing and clutch release lever.

11. In a clutch release bearing having a plurality of rolling elements arranged between first and second bearing rings, the improvement wherein said first bearing ring comprises the inner bearing ring of said bearing and has an axially extending surface radially outward of said second ring, said axially extending surface being formed of parallel opposed sides defining a polygon in cross-section, said sides extending parallel to the axis of said bearing.

12. The clutch release bearing of claim 11 wherein said second bearing ring has generally Z-shaped cross-sections, said first bearing ring extending axially beyond one end of said second bearing ring and having a radially outward extending portion thereon, said axially extending surface extending from said radially outward extending portion, the other end of said second bearing ring having a radially outward extending end.

13. In a clutch release bearing having a plurality of rolling elements arranged between first and second bearing rings, said first bearing ring having a surface extending in a plane normal to the axis of said bearing and directed outward of said bearing, and further comprising a layer on said surface of a brake material.

14. The bearing of claim 13 wherein said layer is comprised of an incompletely set plastic.

15. In a clutch release bearing having a plurality of rolling elements arranged between first and second bearing rings, the improvement wherein said first bearing ring has a generally radially extending surface directed axially outward of said bearing, said surface having radially extending corrugations.

* * * * *